United States Patent [19]

Eschermann et al.

[11] Patent Number: 5,653,614
[45] Date of Patent: Aug. 5, 1997

[54] ELECTRICAL APPARATUS HAVING A SCREW TERMINAL

[75] Inventors: Guy Eschermann, Quetigny; Pierre Merlin, Fontaine les Dijon, both of France

[73] Assignee: Schneider Electric SA, Boulogne, France

[21] Appl. No.: 440,122

[22] Filed: May 12, 1995

[30] Foreign Application Priority Data

Jun. 13, 1994 [FR] France .................................. 94 07284

[51] Int. Cl.$^6$ ....................................................... H01R 4/36
[52] U.S. Cl. ............................. 439/813; 411/412; 411/999
[58] Field of Search ........................... 439/813; 411/412, 411/413, 999, 437

[56] References Cited

U.S. PATENT DOCUMENTS

| | | | |
|---|---|---|---|
| 954,304 | 4/1910 | Kenney | 411/437 |
| 1,157,615 | 10/1915 | Carlson | 411/437 |
| 1,421,638 | 7/1922 | Wheeler | 411/437 |
| 3,414,866 | 12/1968 | Norden | 439/586 |
| 5,304,022 | 4/1994 | Huska | 411/437 |

FOREIGN PATENT DOCUMENTS

| | | |
|---|---|---|
| A-2 675 639 | 4/1992 | France . |
| A-2 667 989 | 10/1992 | France . |
| 548516 | 10/1942 | United Kingdom ................. 411/413 |

*Primary Examiner*—Gary F. Paumen
*Attorney, Agent, or Firm*—Oblon, Spivak, McClelland, Maier & Neustadt, P.C.

[57] ABSTRACT

Electrical apparatus including a cap and having a connection screw terminal cooperating by way of a screwthreaded head with a screwthreaded hole in the cap. The screwthreaded hole has an unthreaded outer part accommodating most of the screwthreaded part of the screwhead. A captive clamping washer is provided to permit clamping of a conductor between the clamping washer and a fixed conductive part.

7 Claims, 1 Drawing Sheet

ELECTRICAL APPARATUS HAVING A SCREW TERMINAL

BACKGROUND OF THE INVENTION

The present invention concerns an electrical apparatus comprising a plastics material cover or cap and having at least one connecting terminal using a conductor clamping screw whose screwthreaded shank can be screwed into a screwthreaded clamping hole in a fixed connection part and whose head is itself screwthreaded to retain the head in a cylindrical retaining hole in the cap at the end of unscrewing the screw.

1. Field of the Invention

Apparatus comprising connecting terminals of this type is described in patent FR-A-2 667 989. Users of such terminals encounter some difficulty in screwing in or unscrewing the screw when the screwthreads on the head and on the corresponding screwthreaded hole in the cap are in mesh.

2. Discussion of the Background

An object of the invention is to overcome this problem by enabling electrical apparatus to accept the connection of cables or closed tags by means of screw terminals requiring less force to turn the screws.

SUMMARY OF THE INVENTION

Another object of the invention is to prevent deterioration of the alignment of the screw and the screwthread in the cap.

In accordance with the invention the retaining screwthread is provided on an inner part of the cylindrical hole in the cap, the remaining outer part of the cylindrical hole having a length sufficient to accommodate most of the length of the screwthreaded part of the screwhead. This significantly reduces the force required to turn the screw.

The screw is preferably provided with a captive clamping washer one side of which is applied to the conductor to be clamped and the other side of which is applied to the abutment surface on the cap, the screwthread on the screwhead being substantially free of the retaining screwthread when the washer is in the abutment position. As a result of this the retaining screwthreads are not damaged if the screw is turned further after the clamping washer reaches the abutment position.

The retaining screwthread can advantageously be provided on small radially projecting sector-shaped members which are equi-angularly spaced, for example at 120°, around the circumference of the cylindrical hole in the cap.

The diameters of the screwthreaded part and of the unthreaded part of the cylindrical hole in the cap advantageously differ by a small radial clearance to enable satisfactory alignment of the screwthreaded shank with the clamping hole when the screw, whose head is in mesh with the retaining screwthread, must be screwed down to clamp the conductor by means of the washer.

If the retaining screwthread is prethreaded, it is preferably oversized to produce a predetermined clearance to accommodate the angular phase difference between the meshing clamping screwthreads on the shank and the meshing retaining screwthreads on the head.

BRIEF DESCRIPTION OF THE DRAWINGS

One non-limiting embodiment of the invention will now be described with reference to the drawings.

In the drawings.

DESCRIPTION OF THE PREFERRED EMBODIMENT

Figure 1:
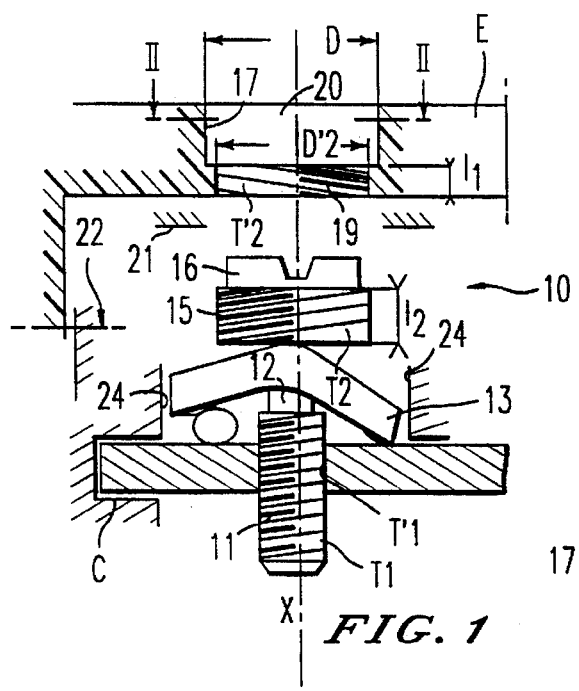
FIG. 1 is a diagrammatic representation of part of electrical apparatus having a specific screw connecting terminal in accordance with the invention.

The screw terminal shown in the figures comprises a screw A adapted to cooperate with a fixed conductive part B fixed into a base or casing C of low-voltage electrical apparatus and with a cap E fixed to the base of the apparatus. The term cap as used hereinafter is to be understood in a broad sense, denoting any cap, cover or casing surrounding all or part of one or more terminals of the apparatus.

The screw A includes a head 10, a screwthreaded shank 11 and a core 12 between the head and the screwthreaded shank; a clamping washer 13 is captive on the core 12, with some freedom of movement. The washer 13 can be flat and rectangular or V-shape as shown in the figures. The male screwthread T1 on the shank 11 cooperates with a female screwthread T'1 in a screwthreaded hole in the fixed conductive part B.

The head 10 of the screw has a screwthreaded part 15 whose diameter, is greater than that of the shank 11 and a maneuvering part 16 recessed for a screwdriver; this part 16 is smooth and has a diameter that is small relative to the part 15. The male screwthread T2 on the part 15 cooperates with a retaining female screwthread T'2 in a cylindrical hole 17 in a relatively rigid wall 18 of the cap E which is perpendicular to the axis X—X of the screw. The pitches of the screwthreads T1, T2 are the same and the smaller diameter part 16 serves to center the screwthread T2 on T'2.

To reduce the force required to turn the screw the retaining screwthread T'2 is formed on an inner part 19 of length $l_1$ of the cylindrical hole 17 in the cover E; the remaining outer part 20 of the hole 17 is unthreaded and its length is sufficient to accommodate the length of the screwthreaded part 15 of the screwhead, the length 11 being less than half the total length of the hole. The diameter D of the part 20 of the hole 17 is slightly greater than the diameter D'2 of the part 19 (the outside diameter of the screwthread T'2) so that the part 15 of the head can move with a small radial clearance in the part 20, to maintain good axial guidance of the screw without increasing the force required to turn it.

Abutment surfaces 21 are provided on the inside of the cap E to prevent further movement of the washer 13 and extraction of the screw A from the apparatus. When the washer 13 is abutted against the surfaces 21 there is an axial clearance e between the head 10 of the screw and the screwthreaded part 19 of the hole 17. The cap E is fixed to the base C of the apparatus by permanent or demountable lateral connections 22, for example clips, adapted to resist forces exerted in the direction X—X on the wall 18 when the screwthreads T2, T'2 come into mesh with the screwthreads T1, T'1 still in mesh.

Figure 2:
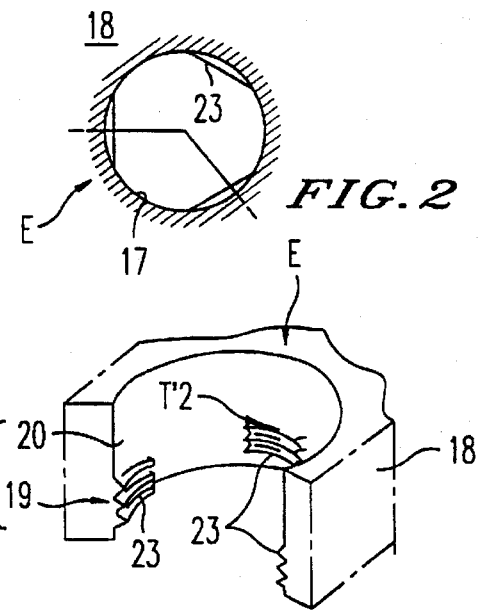
FIG. 2 is a view of part of FIG. 1 in cross-section taken along line II—II in FIG. 1.
Figure 3:
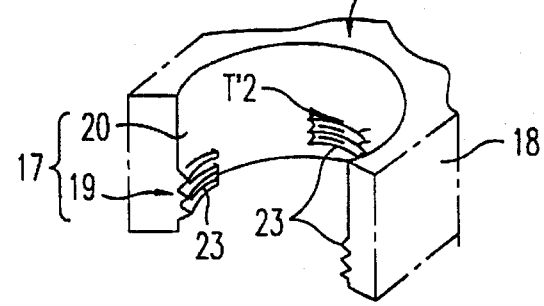
FIG. 3 is a partly cutaway perspective view of the same part of FIG. 1.

The retaining female screwthread T'2 can be provided around all of the circumference of the cylindrical hole 17 (FIG. 1). It is preferably formed on small radially projecting sectors 23 spaced 120° apart; for example (FIGS. 2 and 3). The total length of the threads of the screwthread T'2 is significantly less than that of the threads of the screwthread T2. Baffles 24 are provided in the casing C and/or the cap E to isolate the terminal and to guide movement of the washer 13 in translation along the X—X axis.

The retaining female screwthread T'2 can be formed by a self-tapping action of the male screwthread T2 of the metal head of the screw on the hole 17 in the plastics material wall 18 or the hole 17 can be prethreaded with sufficient clearance to absorb the angular phase difference between the meshing screwthreads T1, T'1 of the shank 11 and T2, T'2 of the head 10.

Operation of the terminal as described will now be described with reference to FIGS. 1, 4 and 5.

Figure 4:
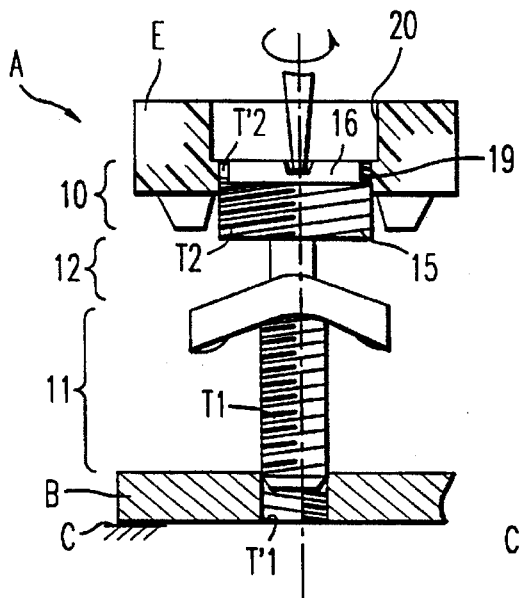
FIGS. 4 and 5 show the screw terminal at two different stages of its use.
Figure 5:
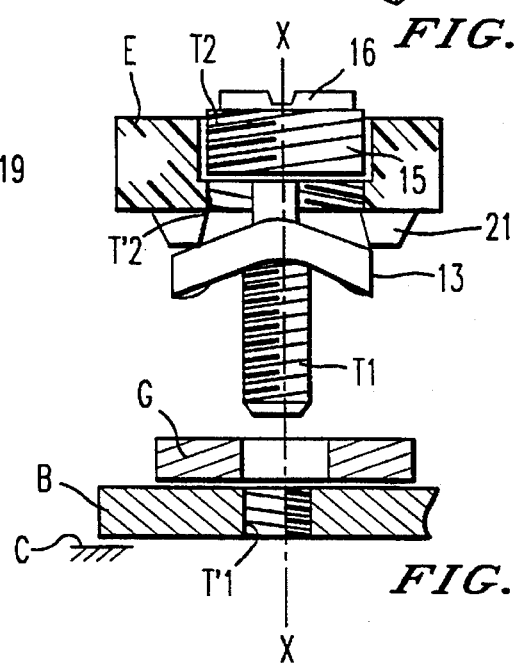
Figure 6:
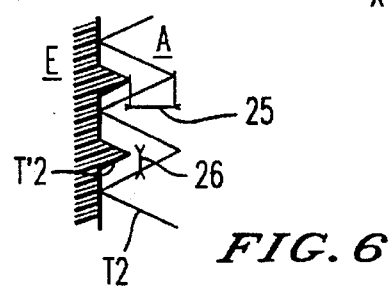
FIG. 6 shows one example of oversizing of the retaining screwthread.

To clamp the bared end of a conductor or cable F into the terminal the screw A is rotated (by means of a screwdriver inserted through the cylindrical hole 17) from the "open" position in FIG. 4 or 5 in which the screwthreads T2, T'2 are in mesh or an intermediate position in which the screwthreads T2, T'2 are not in mesh to the clamping position shown in FIG. 1. The washer 13 which is captive on the core 12 of the screw is guided by the baffles 24 and pivots to fit to the conductor F so that the latter is clamped between the washer, which is abutted against the bottom surface of the head of the screw, and the fixed conductive part B.

To open the terminal fully and in particular to enable it to accept the insertion of closed tags G (FIG. 5), the screw (FIG. 4) is rotated to engage at least a first thread of the screwthread T2 in the screwthread T'2 with the screwthreads T1, T'1 remaining in mesh. The head 10 is centered in the hole 17 by its smaller part 16 and/or by a centering arrangement on the cap E. If the hole 17 is not prethreaded the male screwthread T2 cuts the female screwthread T'2 in the radially projecting members 23 while the fixed part B absorbs the corresponding forces via the screwthreads T1, T'1. If the hole 17 is prethreaded with a screwthread T'2 the angular phase difference of the meshing screwthreads T1, T'1 of the shank and T2, T'2 of the screwhead can be absorbed by forming the screwthread T'2 oversized to produce a radial clearance 25 and an axial clearance 26.

We claim:

1. Electrical apparatus, comprising:
   at least one connecting terminal which includes a screw with a head, a screwthreaded shank and a captive clamping washer located between the head and the screwthreaded shank,
   the screwthreaded shank cooperating with a screwthreaded clamping hole provided in a fixed conductive part of the apparatus enabling clamping of a conductor between the clamping washer and the fixed part,
   the screwhead having a screwthreaded part cooperating with a retaining screwthread in a cylindrical hole in a cap of the apparatus, wherein
   the retaining screwthread is provided on an inner part of the cylindrical hole in the cap,
   a remaining outer part of the cylindrical hole is long enough to accommodate most of the length of the screwthreaded part of the head of the screw and wherein the clamping washer is engageable with an abutment surface of the cap so that the screw is captive within the cylindrical hole in the cap, the screwthread on the screwhead being substantially free of the retaining screwthread when the washer is engaged with the abutment surface of the cap.

2. Apparatus according to claim 1, wherein the retaining screwthread is provided only on small radially projecting sector-shaped members located around the circumference of the cylindrical hole.

3. Apparatus according to claim 2, wherein the screwthreaded part of the screwhead is accommodated in an unthreaded part of a cylindrical hole in the cover with a small radial clearance.

4. Apparatus according to claim 1, wherein the screwhead has a smooth part of a smaller diameter, said smooth part centering the screwthreaded part of the screwhead on the remaining screwthread.

5. Apparatus according to claim 1, wherein the retaining screwthread is self-tapped onto radial projections of the cylindrical hole in the cap by the screwthread on the screwhead.

6. Apparatus according to claim 1, wherein the retaining screwthread is prethreaded into the cylindrical hole and oversized to produce a predetermined clearance absorbing an angular phase difference between the screwthreads located on the shank and the screwthreads located on the head.

7. Apparatus according to claim 2, wherein the radially projecting members are circumferentially spaced apart by 120°.

* * * * *

UNITED STATES PATENT AND TRADEMARK OFFICE
CERTIFICATE OF CORRECTION

PATENT NO. : 5,653,614
DATED : August 5, 1997
INVENTOR(S) : Guy ESCHERMANN, et al.

It is certified that error appears in the above-identified patent and that said Letters Patent is hereby corrected as shown below:

On the title page, item [73], the Assignee's address should be:

--Boulogne Billancourt, France--

Signed and Sealed this

Twenty-fifth Day of November, 1997

*Attest:*

BRUCE LEHMAN

*Attesting Officer*  *Commissioner of Patents and Trademarks*